(12) United States Patent
Cahill et al.

(10) Patent No.: US 8,112,213 B2
(45) Date of Patent: Feb. 7, 2012

(54) ELECTRIC BRAKE ARCHITECTURE WITH DISSIMILAR EMERGENCY BRAKING PATH

(75) Inventors: Eric D. Cahill, Troy, OH (US); Lawrence F. Corio, Troy, OH (US); Bill May, Tipp City, OH (US); Andrew B. Walsh, Dayton, OH (US); Scott Snelling, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 407 days.

(21) Appl. No.: 12/429,303

(22) Filed: Apr. 24, 2009

(65) Prior Publication Data

US 2010/0274458 A1    Oct. 28, 2010

(51) Int. Cl.
  *B60T 8/86* (2006.01)
(52) U.S. Cl. .......... 701/70; 701/3; 701/15; 701/16; 188/2 R; 303/126
(58) Field of Classification Search .......... 701/70, 701/15, 16; 188/2 R; 303/126
  See application file for complete search history.

(56) References Cited

U.S. PATENT DOCUMENTS

| 4,019,110 | A  | * | 4/1977 | Gerry ............ 318/696 |
| 6,402,259 | B2 | * | 6/2002 | Corio et al. ............ 303/20 |
| 2005/0104446 | A1 |  | 5/2005 | Chico et al. |
| 2005/0192733 | A1 |  | 9/2005 | Dellac et al. |
| 2010/0078519 | A1 | * | 4/2010 | Cahill ............ 244/111 |

FOREIGN PATENT DOCUMENTS

WO     01/05655     1/2001

OTHER PUBLICATIONS

Patents Act 1997: Search Report under Section 17 dated Apr. 19, 2010.

* cited by examiner

*Primary Examiner* — Paul N Dickson
*Assistant Examiner* — Nicole Verley
(74) *Attorney, Agent, or Firm* — Snell & Wilmer L.L.P.

(57) ABSTRACT

A system, apparatus and method provide a means for controlling an electric brake actuator. An electromechanical actuator controller (EMAC) is configured to receive first data indicative of a desired braking force, second data indicative of a braking command generated by a brake input device, the second data different from said first data, and third data indicative of a braking mode. Based on the third data, the EMAC selectively uses the first data or the second data to control the actuator.

20 Claims, 5 Drawing Sheets

ELECTRIC BRAKE ARCHITECTURE WITH DISSIMILAR EMERGENCY BRAKING PATH

FIELD OF THE INVENTION

The present invention relates generally to brakes and, more particularly, to a brake architecture for providing parking and emergency braking functions in an aircraft.

BACKGROUND

Aircraft, much like other vehicles, incorporate an emergency braking system that activates the brakes for long term parking, and for emergency stopping when the principal brake system fails. Such emergency brake systems may be electrically or hydraulically operated, and are well known to those having ordinary skill in the art.

In electrically operated emergency brake systems, an emergency brake command signal (in the form of an analog or digital signal) is generated by an emergency brake lever or handle, and this signal is provided to a brake system control unit (BSCU). The BSCU, based on the signal, commands an electro-mechanical actuator controller (EMAC) to power one or more actuators. The EMAC, in response to the command from the BSCU, provides electrical power to an actuator of a brake assembly so as to effect a braking force.

Additionally, electrically operated brake systems also include a separate emergency brake control box. The emergency brake control box is configured to control to the brake actuators during failure of the primary brake system (e.g., during failure of the BSCU).

SUMMARY OF INVENTION

The present invention provides a brake system, apparatus and method for controlling an electrically operated aircraft brake system, wherein the brake system includes an emergency/park input device (e.g., a parking and/or emergency brake lever, pedal, handle, etc.), a brake system control unit (BSCU), one or more electromechanical actuator controllers (EMACs) and a brake assembly including one or more electrical actuators. Each EMAC is electrically coupled to one or more of the actuators so as to provide electrical power for driving the actuators. Each EMAC is also coupled to the BSCU and emergency/park input device so as to receive braking data therefrom.

Each EMAC may include a switch or the like for selecting a signal (e.g., the command from the BSCU or emergency/park input device) to be provided to the EMAC's servo compensation network and driver circuits. The switch is controlled via a braking mode signal (normal or park/emergency) generated based on the emergency/park input device. The output of the switch is coupled to an input of the EMAC's servo compensation network and actuator driver circuits so as to select the signal used by the servo compensation network and driver circuits for controlling the actuators.

For normal brake operation, the BSCU generates a normal brake command signal corresponding to a desired brake force, and provides the normal brake command signal to each EMAC. Each EMAC's processor, based on the normal brake command signal from the BSCU, may further condition the signal for use by the servo compensation network and actuator driver. During normal brake mode, the EMAC's switch selects the signal generated by the EMAC's processor and provides this signal to the servo compensation network and driver circuits. Thus, overall brake control during normal braking is provided via the BSCU and the EMAC's processors.

For parking and/or emergency braking operation, the brake mode signal provided to each EMAC is indicative of park/emergency/mode. Based on this mode, the switch routes an emergency/park brake command signal as generated by the emergency/park input device directly to the EMAC's servo compensation network and actuator drivers. The servo compensation network and drivers then control the actuators so as to effect a braking force. Thus, during parking and/or emergency braking, both the BSCU and the EMAC's processor are bypassed, and brake control is directly provided by the emergency/park input device (e.g., from the brake handle). Such architecture is advantageous as it eliminates the need for a separate (or isolated) emergency control box to command the EMACs in the event of failure of the primary braking system.

According to one aspect of the invention, an electromechanical actuator controller (EMAC) for controlling one or more electric brake actuators is configured to: receive first data corresponding to a first braking command; receive second data corresponding to a second braking command generated by an emergency/park input device, the second data different from the first data; receive third data corresponding to a braking mode; and based on the third data, selectively use the first data or the second data to control the actuator.

The EMAC can include a switch having a first input configured to receive the first data, second input configured to receive the second data, and third input configured to receive the third data, wherein the switch is operative to output the first data or the second data based on the third data. The third input can be generated by at least one of a hardware circuit or a combination hardware/software circuit. Further, the first data can be at least one of a normal braking command or a parking command, and the second data can be an emergency braking command.

The EMAC can include a scaling circuit configured to receive the second data, and scale the second data in accordance with a predetermined function. The EMAC can also include an amplifier circuit, wherein the switch is part of said amplifier circuit. Further, the amplifier circuit can include a servo compensation network having an input configured to receive a control signal, the input operatively coupled to an output of the switch. The amplifier circuit can also include a driver circuit for providing electrical power to the actuator, the driver circuit having an input operatively coupled to an output of the servo compensation network. In one embodiment, the driver circuit is an electric motor driver circuit.

According to another aspect of the invention, an electric brake system for controlling braking operations of a vehicle includes a brake system control unit (BSCU) communicatively coupled to an EMAC, wherein the EMAC is configured use a first braking command signal or a second braking command signal. The BSCU can be configured to provide data indicative of the first braking command signal to the EMAC, and an emergency/park input device can be configured to generate the second brake command signal. The emergency/park input device can include a signal generator for generating the second brake command signal, and a switch for generating the brake mode. Preferably, the emergency/park input device is a combination parking brake and emergency brake input device, although the system may be configured using independent devices for each function. The system can further include the brake actuator electrically coupled to the EMAC, and at least one of a force sensor or a position sensor operatively coupled to the brake actuator.

According to another aspect of the invention, a method for controlling emergency braking in a vehicle equipped with electrical brakes, wherein the electric brakes include an actuator and an electromechanical actuator controller (EMAC) electrically coupled to the actuator. The method includes: providing to the EMAC first data indicative of a normal braking command; providing to the EMAC second data indicative of an emergency/park braking command generated by a emergency/park input device, the second data different from the first data; providing to the EMAC third data indicative of a braking mode; and based on the third data, the EMAC selectively using the first data or the second data to control the actuator.

Preferably, selectively using the first data or the second data includes using a switch of the EMAC to select the first data or the second data. Further, generating the first data includes generating the first data in a brake system control unit (BSCU), and communicating the first data to the EMAC. Generating the second data can include generating the second data via an emergency/park input device, the emergency/park input device being operatively coupled to the EMAC.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION

The principles of the invention will now be described with reference to the drawings. Because the invention was conceived and developed for use in an aircraft braking system, it will be herein described chiefly in this context. However, the principles of the invention in their broader aspects can be adapted braking systems in other types of vehicles. Moreover, the following discussion of an exemplary multi-actuator computer controlled brake actuation system is given for the sake of illustration and not by way of limitation, except as defined in the claims included at the end of this specification. Accordingly, only general operational details and features of such system will be described so as not to obscure the teachings of the present invention with details that may vary from one particular application to another.

Figure 1:
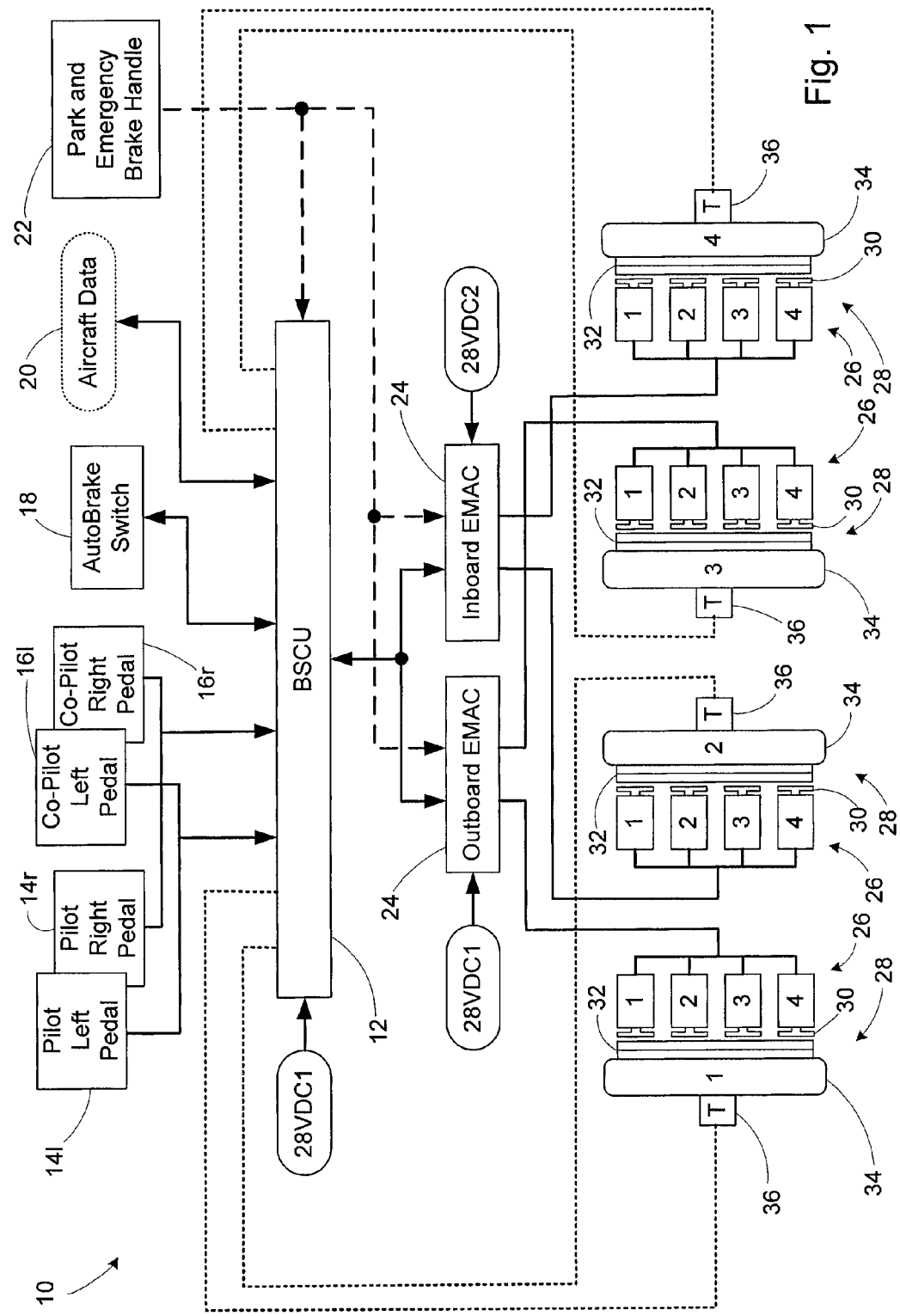
FIG. 1 is a simple schematic diagram illustrating an exemplary architecture for controlling an aircraft braking system in accordance with the present invention.

Referring initially to FIG. 1, there is shown an exemplary electrical brake system 10 having architecture in accordance with the present invention. The exemplary electrical brake system includes a brake system control unit (BSCU) 12 configured to carryout braking operations of the aircraft as is conventional. The BSCU 12 is configured to receive various operator inputs, such as left and right pilot brake pedal signals from left and right pilot brake pedals 14*l* and 14*r*, and left and right co-pilot brake pedal signals from left and right co-pilot brake pedals 16*l* and 16*r*. The brake pedal signals can be generated, for example, via LVDTs (linear variable differential transformers—not shown) operatively coupled to the respective pedals. As the pedals are depressed, each LVDT generates a voltage signal corresponding to the degree of pedal deflection, and this voltage signal can be provided to the BSCU 12 as is conventional. As will be appreciated, other known methods for generating the brake pedal signals may also be employed, including encoders, potentiometers, or the like.

The BSCU 12 may also receive other operator inputs, such as data from an autobrake switch 18 for configuring autobrake logic. The autobrake switch 18 may include several settings, such as an enable/disable input, an auto braking level input (e.g., low, medium, high) and a rejected take off (RTO) input (e.g., for enabling or disabling RTO functionality). The BSCU 12 may also receive other aircraft data 20, such as discrete data (e.g., sensor data such as weight-on-wheels, landing gear up/down, etc.), analog data (e.g., force data, temperature data, etc.), serial data, etc. as is conventional. Optionally, the BSCU may also receive an emergency/park brake command signal for an emergency/park input device 22.

The BSCU 12 is communicatively coupled to one or more electro-mechanical actuator controllers (EMACs) 24, wherein the BSCU 12 provides a brake command signal to the respective EMACs during normal braking operations. Preferably, the coupling is via a serial communication link, although data also can be exchanged via discrete and/or analog connections. The BSCU 12 is configured to derive the brake command signal based on brake data generated by the pedals 14*l*, 14*r*, 16*l*, 16*r*, the emergency/park input device 22, and/or autobrake and antiskid control.

The emergency/park input device 22 (e.g., a handle, lever, pedal, or the like), provides an emergency/park brake command signal to each EMAC 24 (the emergency/park input device 22 is described in more detail below with respect to FIGS. 4A and 4B). The emergency/park brake command signal can be generated using known techniques, such as an LVDT as described above with respect to the brake pedals 14*l*, 14*r*, 16*l*, 16*r*, or via an encoder or potentiometer configured to provide data corresponding deflection or rotation of the emergency/park input device 22. As will be appreciated, other known methods of generating the emergency/park brake command signal may also be employed. Preferably, the emergency/park input device 22 includes a mode selector to indicate when normal or parking/emergency braking is desired. For example, the emergency/park input device 22 may include contacts that are open when the emergency/park input device is in a first position (e.g., rotated to the left or pushed inward) and closed when the emergency/park input device is in a second position (e.g., rotated to the right or pulled outward). Alternatively, the brake mode selector may be separate from the emergency/park input device 22. Further details regarding the emergency/park input device 22 are provided below with respect to FIGS. 4A and 4B.

The EMACs 24 are electrically coupled to one or more actuators 26 of a brake assembly 28, wherein each brake assembly 28 includes the one or more actuators 26, corresponding rams 30 operatively coupled to each actuator 26, and a brake-disk stack 32 having a plurality of rotors coupled for rotation with a wheel 34 and stators rotationally fixed with respect to the wheel 34. Each actuator 26 and ram 30 are configured for forceful engagement with the brake-disk stack 32 so as to provide a brake force to a corresponding wheel 34. Wheel speed sensors 36 provide wheel speed data to the BSCU 12 for implementing anti-skid and autobrake functions as is conventional.

As noted above, each EMAC 24 receives the normal brake command signal from the BSCU 12. In addition to the normal brake command signal, each EMAC 24 is configured to receive the emergency/park brake command signal from the emergency/park input device 22, and the brake mode signal indicative of whether normal brake operation or park/emergency brake operation is desired. Based on the brake mode signal, each EMAC 24 selects a signal corresponding to the normal brake command signal provided by the BSCU 12 or the emergency/park brake command signal provided by the emergency/park input device 22 and, based on the signal, controls the actuators to effect a braking force.

Figure 2:
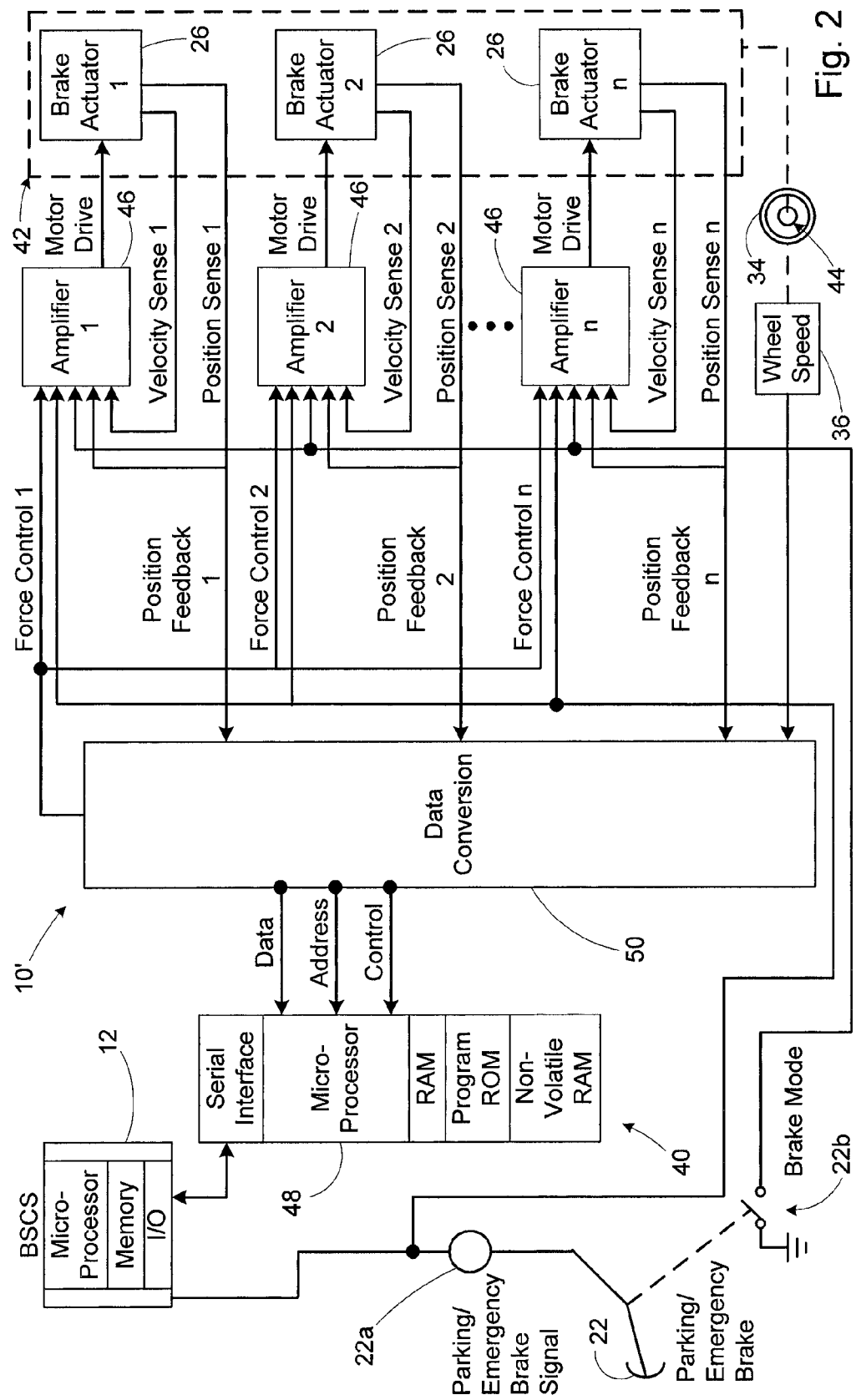
FIG. 2 is a diagrammatic illustration of an exemplary multi-actuator computer controlled brake actuation system.

FIG. 2 diagrammatically illustrates an exemplary multi-actuator computer controlled electrical brake actuation system 10' to which the principles of the invention may be applied. The major functions of the system 10' are performed by an EMAC controller 40 and a brake actuator assembly 42. The brake actuator assembly 42 may be mounted in a conventional manner on a wheel and brake assembly 44 to apply and release braking force on a rotatable wheel 34 of such wheel and brake assembly. Wheel speed data is provided to the controller 40 via a wheel speed sensor 36 coupled to each wheel 34.

In the illustrated exemplary system 10', the brake actuator assembly 42 includes at least one and preferably a plurality of actuators 26, such as electro-mechanical actuators (EMAs) 26. The EMAC controller 40 includes a corresponding number of independent servo amplifiers 46, a micro-processor 48 with associated peripherals, and a data input/output (I/O) circuitry 50. As depicted, plural (for example, four) independent, linear electromechanical servo loops operate in a position mode, i.e., the linear position of each actuator is a function of an analog input voltage (or digital equivalent for a digital signal processor) applied to a position command input.

As noted above, the emergency/park input device 22, via signal generator 22a, generates the emergency/park brake command signal, which is provided to each EMAC (e.g., to each amplifier 46 of the EMAC). Also provided to each amplifier is a brake mode input, which is generated via switch 22b. During normal braking operations, switch 22b is closed, and brake control is performed via the BSCU 12 and EMAC controller 40. However, during park/emergency braking operations, switch 22b is open, and each amplifier 46 uses the braking command as provided by the emergency/park input device 22, thereby bypassing the BSCU 12 and EMAC controller 40. Thus, each amplifier can include a switching means for selecting between the data generated by the BSCU 12 and processor 48, or the actual data provide by the emergency/park input device 22.

Further, prior to using the signal from the emergency/park input device 22, scaling may be applied to the signal. The scaling can compensate for non-linearities inherent in the braking system, or to provide a specific braking profile during emergency/park operation. For example, as the emergency/park input device is operated, a signal proportional to the degree of operation is generated and provided to the EMAC 24. This signal may be represented graphically as a straight line that starts at the origin and increases proportionally with the amount deflection or rotation of the emergency/park input device (e.g., a line defined by the equation $y=mx+b$). The EMAC 24 can take this linear signal and rescale it, for example, by generating a new signal that has multiple slopes. Thus, for example, if the signal generated by the emergency/park input device 22 spans from 0 to 10 volts, then between 0-2.5 volts the EMAC 24 may set the slope (i.e., m) to 1, and between 2.5 and 5 volts the EMAC 24 may set the slope to 1.5. Between 5 and 10 volts, the EMAC 24 may set the slope to 2. As will be appreciated, any type of function may be applied to the emergency/park command signal.

Figure 3:
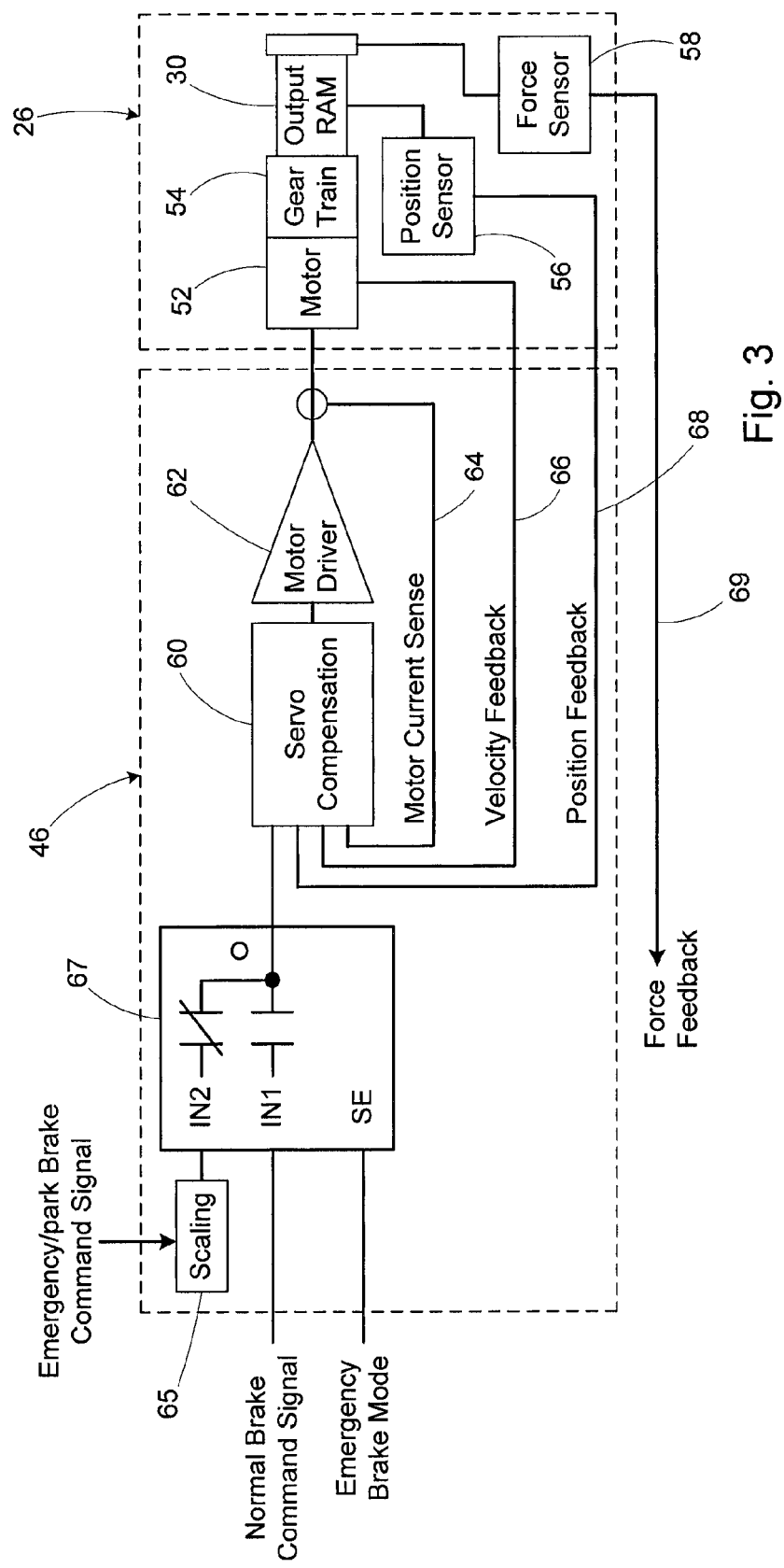
FIG. 3 is a diagrammatic illustration of a brake actuator and associated servo amplifier employed in the system of FIG. 2.

In FIG. 3, a representative electromechanical brake actuator 26 and associated servo amplifier 46 are illustrated in greater detail. The brake actuator 26 includes an electric servo motor 52, gear train 54, and a reciprocating output ram 30. The brake actuator has associated therewith an output ram position sensor 56 which provides for actuator position feedback as depicted, and a force sensor 58 that provides data indicative of a force applied by the brake actuator on the brake-disk stack. Although not shown, the brake actuator 26 also has associated therewith a motor tachometer to provide for velocity feedback.

The servo amplifier 46 includes servo loop compensation network and amplifiers 60, and a DC motor driver 62 with associated control logic and current control circuitry. More particularly, the servo amplifier 46 may include an inner motor current control servo loop 64, an intermediate motor velocity servo loop 66, and a ram position servo loop 68. Force feedback data 69 may be provided to the BSCU 12 for control of actual applied force. Each loop may be compensated to obtain desired performance in terms of bandwidth, and to provide for uniform dynamic response of all brake actuators 26. In addition, the servo amplifier 46 includes means for controlling motor current and therefore the output force of the brake actuator in response to a force control input. The force control input may be an analog input signal that controls motor current level while the aforesaid position command input controls actuator displacement. As will be appreciated, the analog input signals may be replaced by digital input signals if a digital signal processor is used in the servo amplifier for actuator control.

A scaling block 65 of the servo amplifier 46 receives the emergency/park command signal from the emergency/park input device 22, and can apply a scaling function to the signal to create a non-linear brake command signal. Exemplary functions include varying a slope of the signal based on a magnitude of the emergency/park command signal, applying an exponential function to the brake command signal, etc. The output of the scaling block 65 is provided to a second input of a switch 67 as described below.

Switch 67 provides an input to the servo loop compensation network 60. Preferably, switch 67 is an electronic or software switch. However, a mechanical switch may be employed depending on the configuration of the EMAC 24. The switch 67 includes a first input IN1 configured to receive the normal brake command signal from the EMAC controller 40 (which effectively is derived from the pedals 14l, 14r, 16l, 16r and/or autobrake/antiskid logic from the BSCU 12), and a second input IN2 configured to receive the emergency/park brake command signal from the emergency/park input device 22 (as scaled by the scaling block 65). A select input SE of switch 67 is coupled to the mode switch 22a, and an output of switch 67 is coupled to the servo loop compensation network as noted above. Based on the particular braking mode as indicated by the mode switch 22b, the switch 67 will provide either the normal brake command signal (from the EMAC controller 40) or the emergency/park brake command signal (from the emergency/park input device 22) to the servo loop compensation network 60. Preferably, the switch is part of the EMAC, although it is possible for the switch to be separate from the EMAC 24.

During normal braking, the select input SE is true, and the switch 67 connects the first input IN1 to the switch output, thereby coupling the normal brake command signal from the EMAC controller 40 to the servo loop compensation network 60 (and thus the motor driver 62). Accordingly, the displacement of each actuator 26 is controlled by the electronic controller 40 (FIG. 2) and the BSCU 12. The micro-processor 48 of the controller 40 provides brake control algorithm processing, temporary data storage in RAM, program memory storage, non-volatile data storage, and control of the servo amplifiers 46 via the input/output circuitry 50. The input/output circuitry 50 provides for digital-to-analog data conversion, generating the analog position commands and the analog motor current control commands to the four actuators, analog-to-digital data conversion to monitor the actuator position sense and motor current feedback signals, and signal discretes for auxiliary functions such as motor brake control. Although micro-processors are utilized in the illustrated preferred embodiment, processing could be done analog as opposed to digital, or intermixed with digital processing as may be desired.

During park/emergency braking operations, both the BSCU 12 and controller 40 are bypassed, and the displacement of each actuator 26 is directly controlled by emergency/park input device 22. More specifically, when the brake mode corresponds to park/emergency braking, the select input SE is false, and the switch 67 connects the second input IN2 to the switch output, thereby coupling the emergency/park brake command signal from the emergency/park input device 22 to the servo loop compensation network 60. Thus, in the event of primary brake system failure, park/emergency braking can be provided via the each EMAC 12, without the need for a separate emergency control unit.

While FIGS. 2 and 3 illustrate position and force control, it is noted that this is merely exemplary. The principles in accordance with the invention may be applied to any conventional brake control schemes.

Figure 4A:
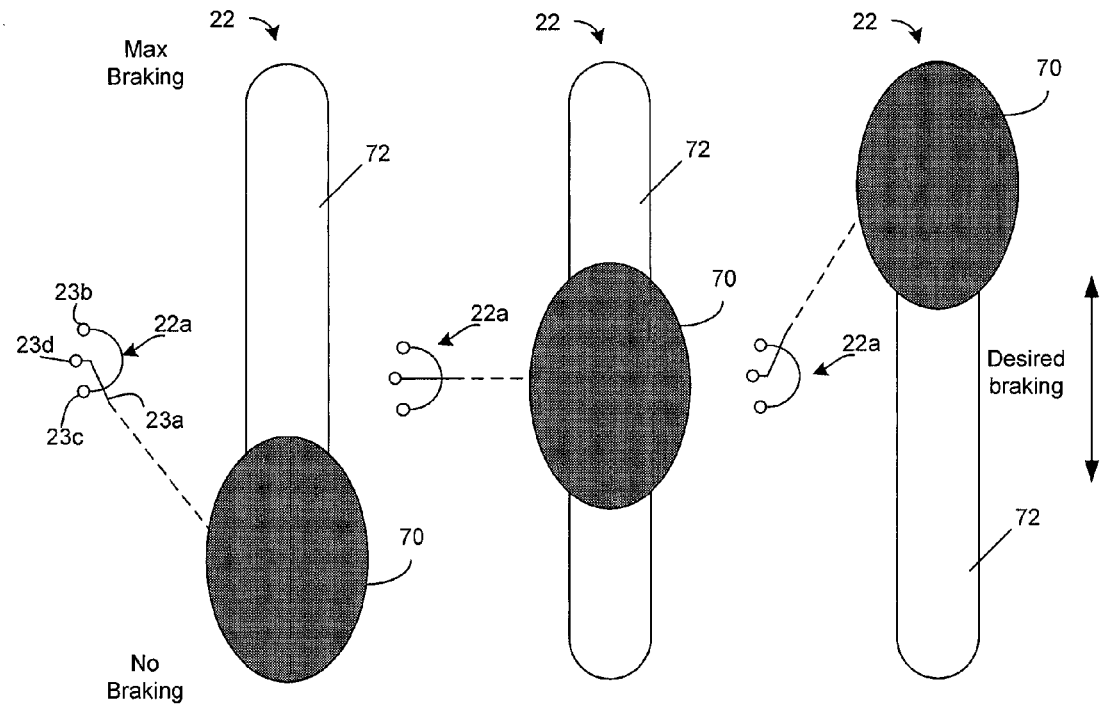
FIGS. 4A and 4B are schematic diagrams illustrating an exemplary brake controller that can be used with the present invention.
Figure 4B:
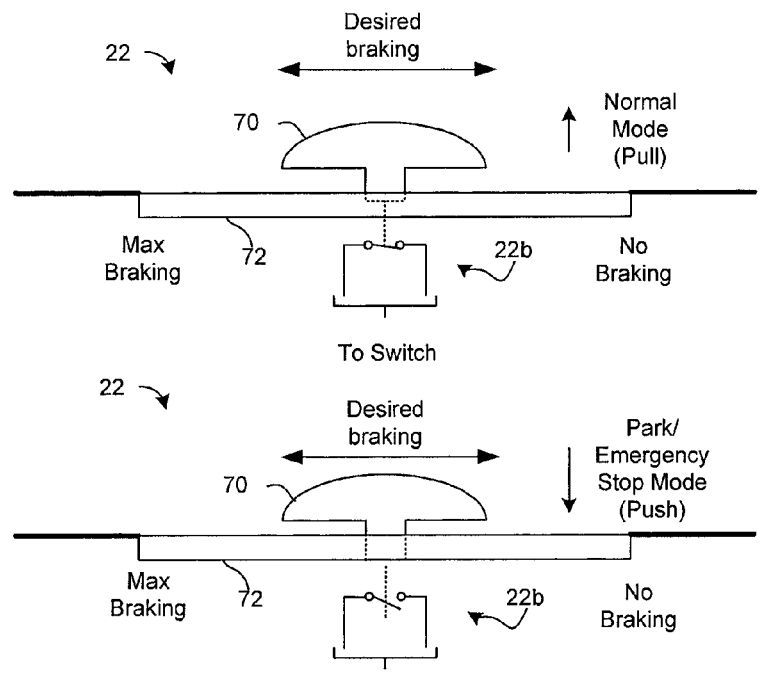

Referring now to FIGS. 4A and 4B, an emergency/park input device 22 is schematically shown from a top view (FIG. 4A) and a side view (FIG. 4B). The exemplary emergency/park input device 22 includes a handle 70 configured for movement along a channel or guide 72. Operatively coupled to the handle 70 is a signal generator 22a, such as a potentiometer 22a, wherein movement of the handle 70 along the channel 72 causes a corresponding deflection of a wiper arm 23a of the potentiometer. By applying a voltage across the outer terminals 23b and 23c of the potentiometer 22a, a brake command signal can be generated at the wiper arm terminal 23d that corresponds to the position of the handle within the channel (and thus the desired amount of braking). Additionally, a brake command curve, instead of being implemented in the EMAC 12, may be implemented external from the EAMC. As described herein, such curve can condition the voltage (or other signal) from the wiper arm terminal 23d, wherein linear movement of the emergency/park input device 22 within a first movement range follows a first slope (e.g., x PSI/Inch up to 75% deflection of the input device) and within a second movement range follows a second slope (e.g., y PSI/Inch for the remaining 25% deflection of the input device).

It is noted that reference to a potentiometer is merely exemplary, and other devices, such as an LVDT, encoder, etc. may be used in place of the potentiometer to derive the brake command signal. Although not shown in FIG. 4A, the terminals of the potentiometer 22a are electrically coupled to the EMAC 24 so as to provide the brake command signal thereto.

With further reference to FIG. 4B, a simple side schematic view of the exemplary emergency/park input device 22 is shown. The handle 70, in addition to being operatively coupled to the signal generator 22a, is also operatively coupled to switch 22b. Preferably, handle 70 is a maintained push-pull handle such that it can be maintained in an out position (pull) or an in position (push). When in the "out/pull" position, switch 22b is in an electrically closed state, and while in the "in/push" position, switch 22b is in an electrically open state. The "out/pull" position can correspond to normal braking mode (i.e., brake control via the BSCU 12), while the "in/push" position can correspond to park/emergency mode. Switch 22b is electrically coupled to switch 67 so as to provide an indication of the current braking mode (normal or park/emergency).

In another embodiment, the emergency/park input device can comprise a rotatable handle (as opposed to a push/pull device). In this embodiment, rotation of the handle in one direction (e.g., left) may correspond to normal brake mode, and rotation of the handle in another direction (e.g., right) can correspond to park/emergency brake operation.

Accordingly, the emergency/park input device 22 can provide both a park/emergency brake reference, and a mode indicator that can be used to configure the brake system's mode of operation. This is advantageous, as the pilot need only manipulate a single controller for park/emergency brake operation.

Figure 5:
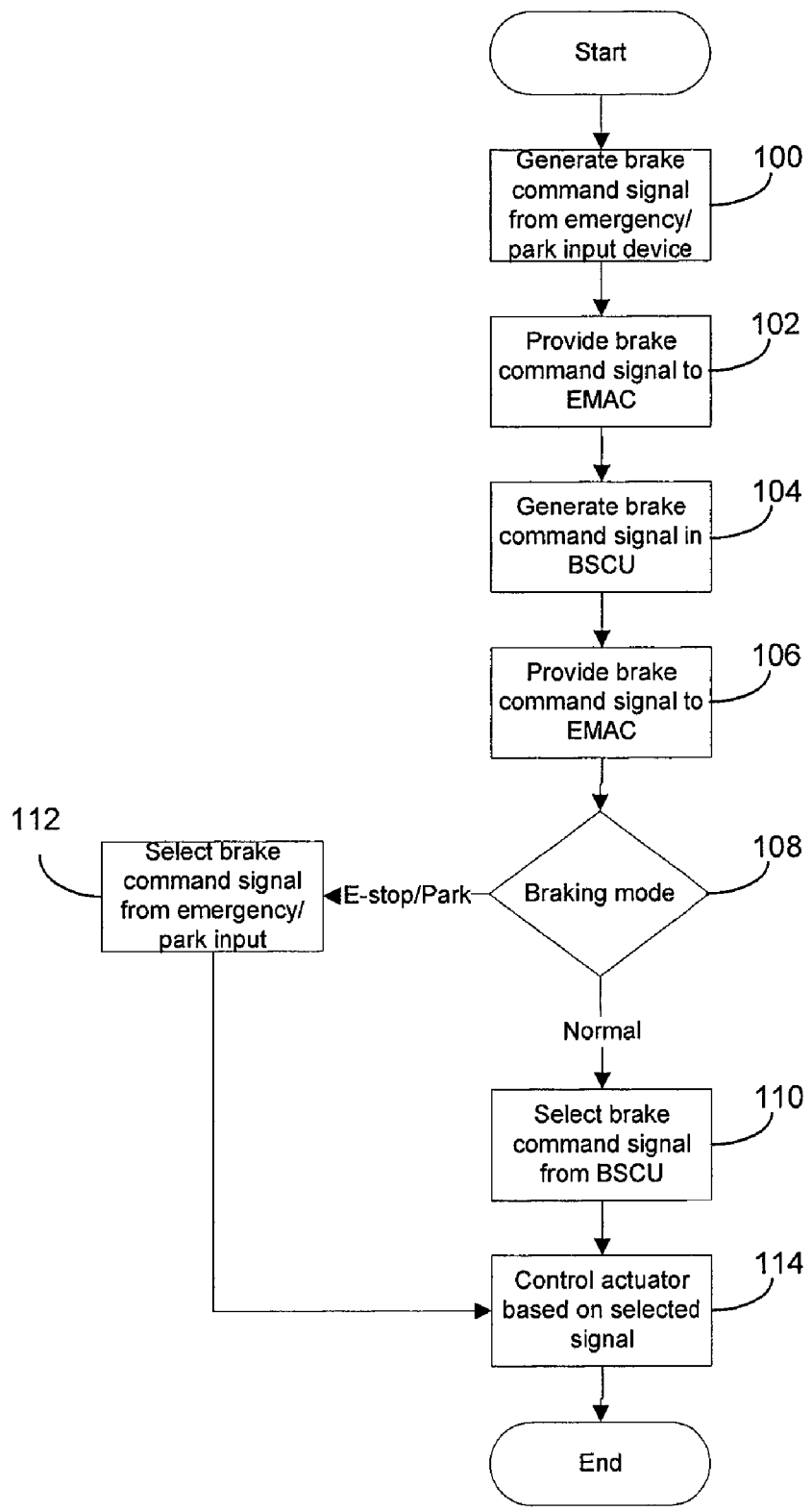
FIG. 5 is a flow chart illustrating an exemplary method of controlling electric brakes in accordance with the present invention.

Instead of a normal mode and "emergency/park mode" as described above, the brake system may be configured to have a normal mode and an "emergency mode". During normal mode, all brake commands (including parking commands) are generated by the BSCU 12 and provided to the EMAC 24. The parking command can be generated from the brake input device 22, which in addition to being provided to the EMAC 24, can also be also provided to the BSCU 12. The BSCU may also receive an input corresponding to park mode so as to know when the brake command signal should correspond to the pedals 14l, 14r, 16l and 16r or the brake input device 22. For example, when using a rotary brake input device, a center position may correspond to normal brake operation, rotation to the left may correspond to parking mode operation, and rotation to the right may correspond to emergency mode operation. The BSCU 12 can receive an input corresponding to parking mode operation and act accordingly. When in parking mode, the BSCU 12 can generate a brake command signal based on the brake input device 22, and while in normal mode the BSCU 12 can generate a brake command signal based on the brake pedals 14l, 14r and 16l, 16r. Further, in both park mode and normal mode, the EMAC 24 will select the signal from the BSCU 12. However, when in emergency mode, the EMAC 24 will use the signal provided by the brake input device 22. With additional reference to FIG. 5, illustrated are logical operations to implement an exemplary method for operating electric vehicle brakes in accordance with the present invention. Although FIG. 5 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

Beginning at block 100, the emergency/park brake command signal is generated by the emergency/park input device 22. As noted herein, the emergency/park brake command signal can be generated by a signal generator 22a or the like coupled to the emergency/park input device 22. As the emergency/park input device 22 is manipulated (e.g., as a brake handle is moved), the emergency/park brake command signal varies so as to correspond to the degree of movement of the emergency/park input device. Next at block 102, the emergency/park brake command signal is provided to the EMAC 24. More particularly, the brake command signal is provided to an input of the EMAC 24, such as an analog input or other input corresponding to the type of brake command signal (e.g., analog, digital, etc.). Alternatively, the emergency/park command signal may be generated via means other than physical lever and switch, such as a multifunction display having a touch screen. Using the touch screen, the brake level and/or braking mode may be set.

At block 104, the BSCU 12 proceeds to calculate a normal brake command signal to be provided to the EMAC 24 in a conventional manner. At block 106, the BSCU 12 provides the normal brake command signal to the EMAC 24, for example, via a serial communication link, or as an analog signal, and the EMAC may proceed to further calibrate the signal, as necessary.

At block 108, it is determined if the braking request is a normal brake request or a park/emergency brake request. As noted herein, the particular braking mode can be determined from the switch 22b operatively coupled to the emergency/park input device 22. If the emergency/park input device 22 is rotated in a first direction (or pulled to an extended position), then this may be interpreted as a normal brake request. If the emergency/park input device is rotated in a second direction (or pushed to a compressed position), this action may be interpreted as a park/emergency brake request. If the braking request is a normal brake request, then at block 110, the normal brake command signal as provided by the BSCU 12 (and further conditioned by the EMAC processor 48) is selected. However, if the braking request is a park/emergency braking request, then at block 112 the emergency/park brake command signal as provided by the emergency/park input device 22 is selected. As described herein, selection of the appropriate brake signal may be via switch 67, which may or may not be part of the EMAC 24. At block 114, the selected brake signal is used to control the actuator.

Accordingly, the brake architecture in accordance with the present invention eliminates the need for a separate (or isolated) emergency brake control box to command the EMACs 24 in the event of primary braking system failure. Further, comparable function to conventional hydraulic braking systems is provided.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electromechanical actuator controller (EMAC) for controlling an electric brake actuator, said EMAC configured to:
   receive first data corresponding to a first braking command generated based on a first brake input device;
   receive second data corresponding to a second braking command generated based on a second brake input device, said second data different from said first data;
   receive third data corresponding to a braking mode; and
   based on the third data, selectively use the first data or the second data to control the actuator.

2. The EMAC according to claim 1, further comprising a switch having a first input configured to receive the first data, second input configured to receive the second data, and third input configured to receive the third data, wherein the switch is operative to output the first data or the second data based on the third data.

3. The EMAC according to claim 2, further comprising an amplifier circuit, wherein said switch is part of said amplifier circuit.

4. The EMAC according to claim 3, wherein said amplifier circuit comprises a servo compensation network having an input configured to receive a control signal, said input operatively coupled to an output of said switch.

5. The EMAC according to claim 4, wherein said amplifier circuit further comprises a driver circuit for providing electrical power to the actuator, said driver circuit having an input operatively coupled to an output of said servo compensation network.

6. The EMAC according to claim 2, wherein the third input is generated by at least one of a hardware circuit or a combination hardware/software circuit.

7. The EMAC according to claim 1, further comprising a scaling circuit configured to receive the second data, and apply scale to the second data in accordance with a predetermined function.

8. The EMAC according to claim 1, wherein the first data is at least one of a normal braking command or a parking command, and the second data is an emergency braking command.

9. An electric brake system for controlling braking operations of a vehicle, comprising:
   the EMAC according to claim 1; and
   a brake system control unit (BSCU) communicatively coupled to said EMAC and configured to provide the data indicative of the desired braking force to said EMAC.

10. The brake system according to claim 9 wherein said second brake input device is operatively coupled to the EMAC so as to provide the second brake command to the EMAC.

11. The brake system according to claim 10, wherein the second brake input device includes a signal generator for generating the second brake command, and a switch for generating the brake mode.

12. The brake system according to claim 11, wherein the second brake input device is a combination parking brake and emergency brake input device.

13. The brake system according to claim 9, further comprising the brake actuator electrically coupled to the EMAC.

14. The brake system according to claim 13, wherein the brake actuator comprises an electric motor.

15. The brake system according to claim 13, further comprising at least one of a force sensor or a position sensor operatively coupled to said brake actuator.

16. A method for controlling emergency braking in a vehicle equipped with electrical brakes having an actuator and an electromechanical actuator controller (EMAC) electrically coupled to the actuator, comprising:
   providing first data indicative of a first braking command generated based on a first brake input device;
   providing second data indicative of a second braking command generated based on a second brake input device, said second data different from said first data;
   providing third data indicative of a braking mode; and
   based on the third data, selectively using the first data or the second data to control the actuator.

17. The method according to claim 16, wherein selectively using the first data or the second data includes using a switch to select the first data or the second data.

18. The method according to claim 16, wherein providing the first data includes generating the first data in a brake system control unit (BSCU) and communicating the first data to the EMAC.

19. The method according to claim 16, wherein the second brake input device is a combination parking brake and emergency brake input device.

20. The method according to claim 16, wherein the braking mode is one of a normal brake mode, park brake mode or an emergency brake mode.

* * * * *